US012608968B2

(12) United States Patent
Balaraman et al.

(10) Patent No.: US 12,608,968 B2
(45) Date of Patent: Apr. 21, 2026

(54) METHOD AND SYSTEM OF GROUPING DOCUMENTS BASED ON DOCUMENT LAYOUT DETERMINATION

(71) Applicant: L&T TECHNOLOGY SERVICES LIMITED, Chennai (IN)

(72) Inventors: Mridul Balaraman, Bangalore (IN); Madhusudan Singh, Bangalore (IN); Ashwin Kanth, Bangalore (IN); Pinak Pani Gogoi, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 282 days.

(21) Appl. No.: 18/434,893

(22) Filed: Feb. 7, 2024

(65) Prior Publication Data

US 2024/0412549 A1     Dec. 12, 2024

(30) Foreign Application Priority Data

Jun. 12, 2023    (IN) .............................. 202341040073

(51) Int. Cl.
G06V 30/414        (2022.01)
G06V 30/10         (2022.01)
G06V 30/418        (2022.01)

(52) U.S. Cl.
CPC ............ G06V 30/414 (2022.01); G06V 30/10 (2022.01); G06V 30/418 (2022.01)

(58) Field of Classification Search
CPC .... G06V 30/414; G06V 30/10; G06V 30/418; G06V 10/82
See application file for complete search history.

(56) References Cited

U.S. PATENT DOCUMENTS

| | | | | |
|---|---|---|---|---|
| 2014/0067631 A1* | 3/2014 | Dhuse | .................... | G06Q 40/10 |
| | | | | 705/30 |
| 2018/0121392 A1* | 5/2018 | Zhang | .................... | G06F 40/169 |
| 2020/0081911 A1* | 3/2020 | Vallabhajosyula | .... | G06N 20/00 |
| 2024/0020473 A1* | 1/2024 | Singh | .................... | G06V 30/412 |
| 2024/0355135 A1* | 10/2024 | Vanapalli Venkata | ...................... | |
| | | | | G06V 30/413 |
| 2024/0411819 A1* | 12/2024 | Sureshbabu | ........... | G06N 20/00 |
| 2024/0420493 A1* | 12/2024 | Balaraman | ............. | G06V 30/12 |

OTHER PUBLICATIONS

Tran, Hong & Nguyen, Quan & Aly, Teppi & Mai, Xuan & Nguyen, Quoc. (2022). A Deep Learning-Based System for Document Layout Analysis. 20-25. 10.1145/3523150.3523154. (Year: 2022).*

(Continued)

*Primary Examiner* — Abhishek Sarma
(74) *Attorney, Agent, or Firm* — Kendal M. Sheets

(57) ABSTRACT

A method and system of grouping a plurality of documents is disclosed. The method includes determining a plurality of text features of each of the plurality of documents. A plurality of image features of each of the plurality of documents are determined. A layout features set of each of the plurality of documents are determined based on the plurality of text features and the plurality of image features. Each of the plurality of documents in one group from a set of groups is grouped based on determination of a document layout of each of the plurality of documents.

12 Claims, 6 Drawing Sheets

(56) References Cited

OTHER PUBLICATIONS

Shanshan Zhang ; Deep Learning for Unstructured Data by Leveraging Domain Knowledge; Aug. 2019; ProQuest LLC; Temple University Libraries; USA; p. 1-12.

Jan Egger, Antonio Pepe, Christina Gsaxner, Yuan Jin, Jianning Li, Roman Kern; Deep learning-a first meta-survey of selected reviews across scientific disciplines, their commonalities, challenges and research impact; National Library of Medicine; Nov. 17, 2021; vol. 7.

Tian Tian; Domain Adaptation and Model Combination for the Annotation of Multi-source, Multi-domain Texts; HAL Open Science; Paris; Jun. 11, 2020.

Akshay Srivatsan, Jonathan T. Barron, Dan Klein, Taylor Berg-Kirkpatrick; A Deep Factorization of Style and Structure in Fonts; Deep AI; Oct. 2, 2019.

* cited by examiner

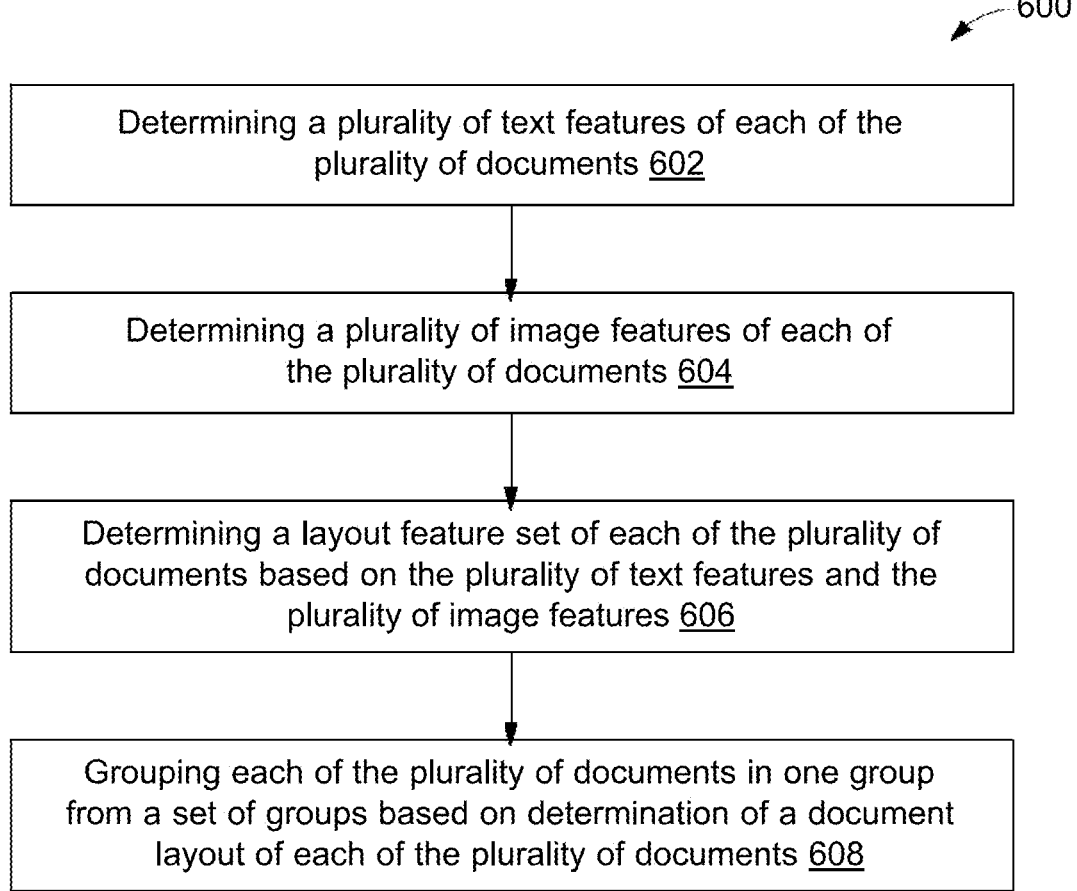

600

Determining a plurality of text features of each of the plurality of documents 602

Determining a plurality of image features of each of the plurality of documents 604

Determining a layout feature set of each of the plurality of documents based on the plurality of text features and the plurality of image features 606

Grouping each of the plurality of documents in one group from a set of groups based on determination of a document layout of each of the plurality of documents 608

FIG. 6

METHOD AND SYSTEM OF GROUPING DOCUMENTS BASED ON DOCUMENT LAYOUT DETERMINATION

TECHNICAL FIELD

This disclosure relates generally to image processing, and more particularly to a method and a system of grouping documents based on layout determination.

BACKGROUND

Multiple documents are exchanged by organizations related to various purposes. However, grouping the documents based on the type of document becomes onerous and erroneous when done manually. Further, documents such as financial documents include information which may not have a pre-defined format or structure hence, detection and extraction of information from such financial documents becomes very tricky. As separate document layouts are used for different data extraction purposes, it is cumbersome to identify the unique sets of layouts for similar data extraction task.

Some available techniques may allow layout detection of a document using NLP algorithm or image processing algorithms. However, grouping documents based on layout detection involves manual effort as well as other AI/ML techniques which are not very efficient.

Therefore, there is a requirement for an efficient methodology to group documents based on layout detection.

SUMMARY OF THE INVENTION

In an embodiment, a method of grouping a plurality of documents is disclosed. The method may include, determining by a processor, a plurality of text features of each of the plurality of documents. The processor may further determine a plurality of image features of each of the plurality of documents. Accordingly, the processor may determine a layout feature set of each of the plurality of documents based on the plurality of text features and the plurality of image features. The processor may group each of the plurality of documents in one group from a set of groups based on determination of a document layout of each of the plurality of documents. In an embodiment, the document layout of each of the plurality of documents may be determined based on the corresponding layout feature set using an unsupervised machine learning model. In an embodiment, each group from the set of groups may correspond to a unique document layout.

In another embodiment, a system of grouping a plurality of documents is disclosed. The system may include a processor, a memory communicatively coupled to the processor, wherein the memory may store processor-executable instructions, which when executed by the processor may cause the processor to determine a plurality of text features of each of the plurality of documents. The processor may further determine a plurality of image features of each of the plurality of documents. Accordingly, the processor may determine a layout feature set of each of the plurality of documents based on the plurality of text features and the plurality of image features. Further, the processor may group each of the plurality of documents in one group from a set of groups based on determination of a document layout of each of the plurality of documents. In an embodiment, the document layout of each of the plurality of documents may be determined based on the corresponding layout feature set using an unsupervised machine learning model. In an embodiment, each group from the set of groups may correspond to a unique document layout.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 is a flowchart of a method for grouping documents based on layout determination, in accordance with some embodiments of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

The current disclosure helps in grouping different documents based on its template or layouts. The documents may be categorized into different categories based on its inherent image embeddings and text embeddings. In an exemplary scenario, in case 1000s of different documents belonging to various templates or layouts are to be separated or categorized based on similarity of layouts, it may consume significant amount of time and effort to perform such categorization. The current disclosure provides unique ML technique or process that may minimize the time and effort in performing such categorization. The present disclosure provides a methodology for categorizing a document image based on layout determination.

Figure 1:
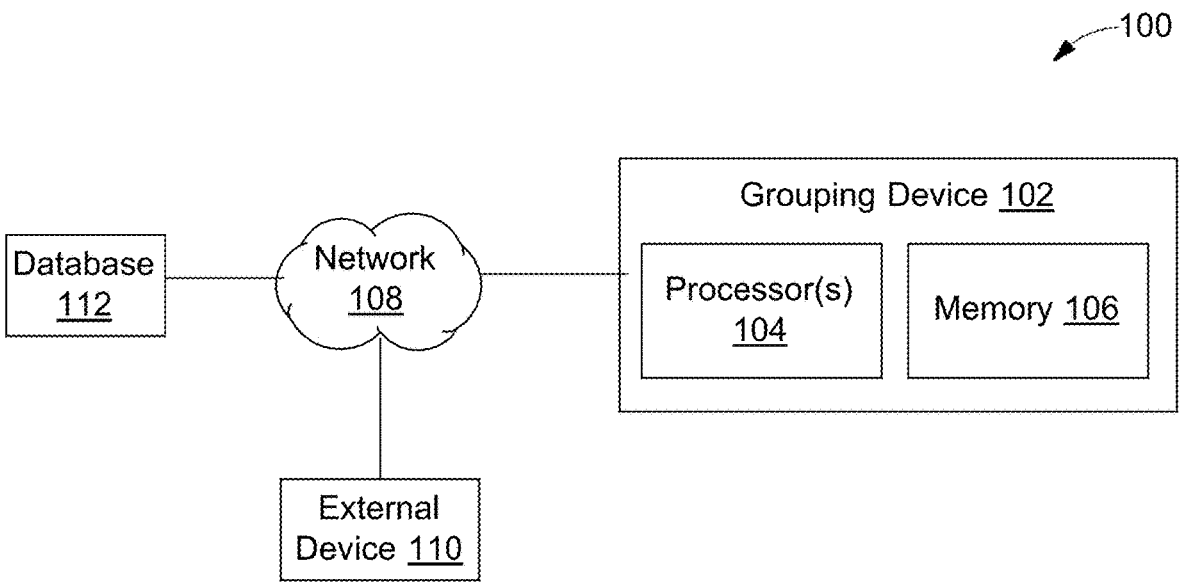
FIG. 1 illustrates a block diagram of an exemplary document grouping system for grouping documents based on layout determination, in accordance with some embodiments of the present disclosure.

Referring now to FIG. 1, a block diagram of an exemplary document grouping system 100 for grouping a plurality of documents based on document layout determination is illustrated, in accordance with some embodiments of the present disclosure. The document grouping system 100 may include a grouping device 102, an external device 110, and a database 112 communicably coupled to each other through a wired or a wireless communication network 108. The grouping device 102 may include a processor 104 and a memory 106. In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors. The memory 106 may store instructions that, when executed by the processor 104, may cause the processor 104 to group documents based on document layout determination, as discussed in greater detail below. The memory 106 may be a non-volatile memory or a volatile memory. Examples of non-volatile memory may include but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

In an embodiment, the database 112 may be enabled in a cloud or a physical database comprising one or more document images comprising text and/or image data. In an embodiment, the database 112 may store data inputted by an external device 110 or generated by the grouping device 102.

In an embodiment, the communication network 108 may be a wired or a wireless network or a combination thereof. The network 108 can be implemented as one of the different types of networks, such as but not limited to, ethernet IP network, intranet, local area network (LAN), wide area network (WAN), the internet, Wi-Fi, LTE network, CDMA network, and the like. Further, network 108 can either be a dedicated network or a shared network. The shared network represents an association of the different types of networks that use a variety of protocols, for example, Hypertext Transfer Protocol (HTTP), Transmission Control Protocol/ Internet Protocol (TCP/IP), Wireless Application Protocol (WAP), and the like, to communicate with one another. Further network 108 can include a variety of network devices, including routers, bridges, servers, computing devices, storage devices, and the like.

In an embodiment, the grouping device 102 may receive a request for grouping a plurality of documents from the external device 110 through the network 108. In an embodiment, the external device 110 may be a computing system, including but not limited to, a smart phone, a laptop computer, a desktop computer, a notebook, a workstation, a portable computer, a personal digital assistant, a handheld, a scanner, or a mobile device. In an embodiment, the grouping device 102 may be, but not limited to, in-built into the external device 110 or a standalone computing device.

By way of an example, the processor 104 may determine a plurality of text features of each of the plurality of documents. In an embodiment, the plurality of documents may include documents in either text recognized format or in image format. In an embodiment, the text features may be determined based on determination of character embedding and position vectors of each character of text data in each of the plurality of documents. In an embodiment, text data of each of the plurality of documents of image format, may be extracted using a text extraction tool such as, but not limited to, optical character recognition (OCR) tool, etc. Further, the processor 104 may determine a plurality of image feature of each of the plurality of documents. In an embodiment, the image features may be determined using an encoder-decoder (DL) model. The processor 104 may further determine a layout feature set of each of the plurality of documents based on the plurality of text features and the plurality of image features.

In an embodiment, the processor 104 may further group the each of the plurality of documents in one group from a set of groups based on determination of a document layout of each of the plurality of documents. The document layout of each of the plurality of documents may be determined based on the corresponding layout feature set using an unsupervised machine learning model. In an embodiment, each group from the set of groups may correspond to a unique document layout. The grouping of each of the plurality of documents may be done based on determination of a similarity of document layout between at least two documents from the plurality of documents based on a comparison of the corresponding layout features sets of the corresponding at least two documents. The similarity in document layouts of at least two documents from the plurality of documents may be determined using an Artificial intelligence-based similarity determination model.

Figure 2:
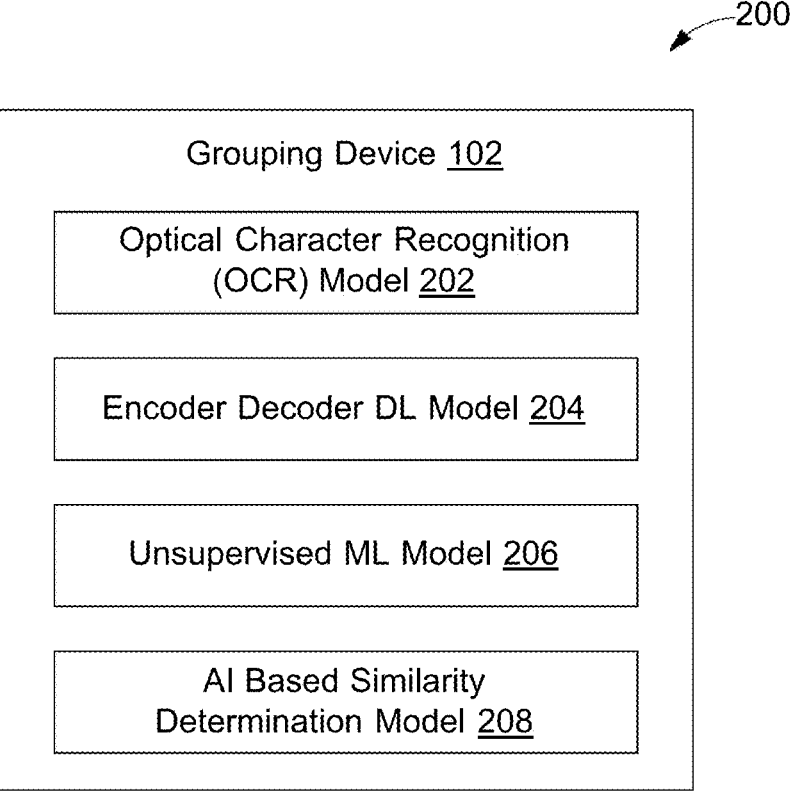
FIG. 2 illustrates a functional block diagram of the grouping device, in accordance with some embodiments of the present disclosure.

Referring now to FIG. 2, a functional block diagram of the grouping device 102 is illustrated, in accordance with some embodiments of the present disclosure. The grouping device 102 may include an optical character recognition (OCR) model 202, an encoder decoder deep learning (DL) model 204, an unsupervised machine learning (ML) model 206, and an artificial intelligence (AI) based similarity determination model 208. In an embodiment, the OCR model 202 may determine the plurality of text features of each of the plurality of documents. The text features may be determined based on determination of character embedding and position vector of each character of text data in each document. The character embeddings of text data of each document may include a character embedding vector of 'n' bits and the position embeddings may include a position embedding vector of 'm' bits representing coordinate position of each character, a font type, a font size, case information such as (small case, upper case, mixed case, camel case, etc.), a typography information such as (underline, bold, italic, etc.), etc. In an embodiment, a format of a typical character embedding of each character of text data may be represented as [Position (X1, Y1, X2, Y2), Font size, Style, etc.].

Figure 3:
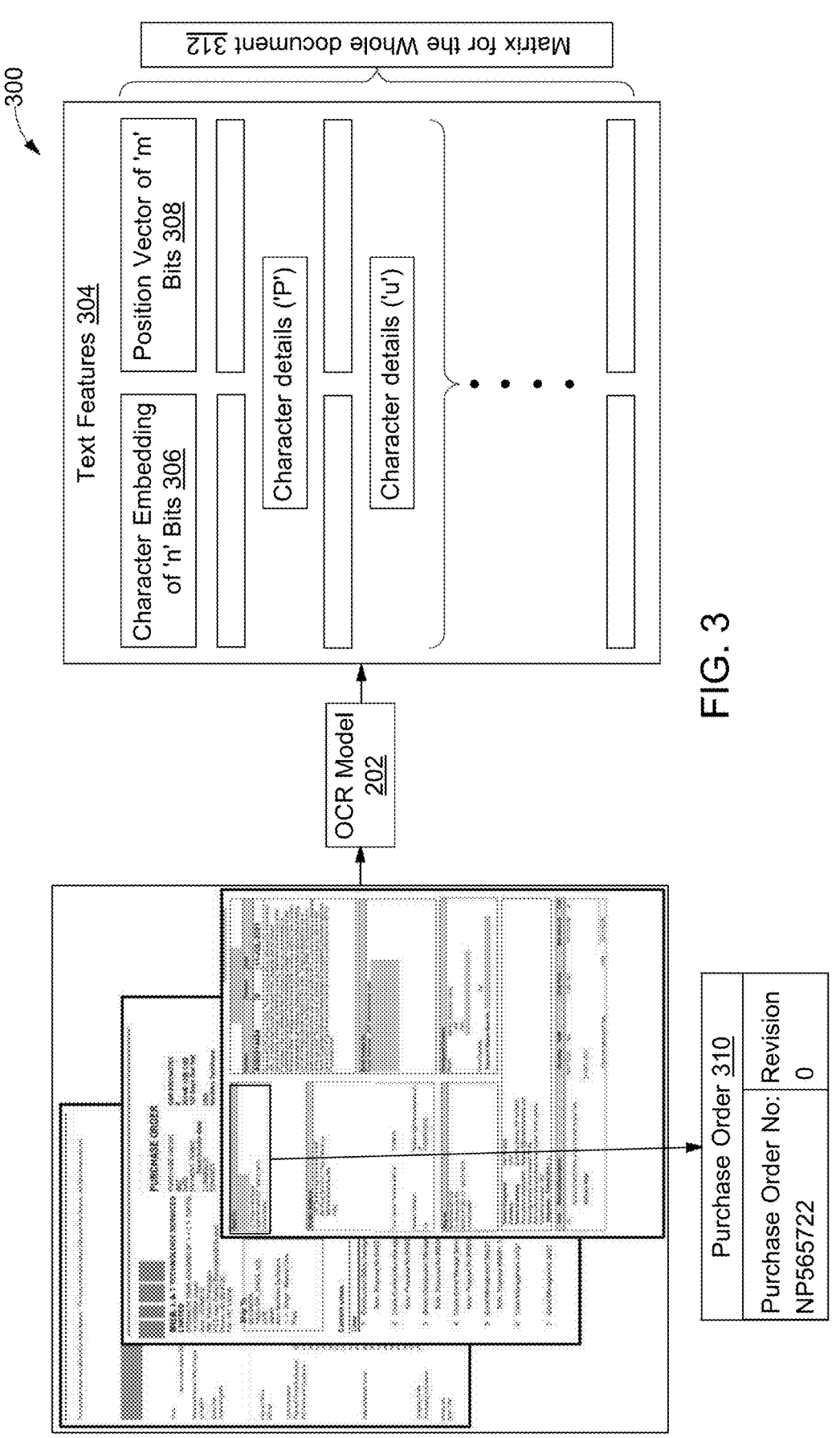
FIG. 3 illustrates an exemplary block diagram depicting the functioning of OCR model, in accordance with an embodiment of the present disclosure.

Referring now to FIG. 3, an exemplary block diagram 300 depicting the functioning of the OCR model 202 is illustrated, in accordance with an embodiment of the present disclosure. The block diagram 300 of the OCR model 202 may depicts a plurality of documents 302 being inputted to the OCR model 202. In an exemplary embodiment, one of the documents 302 may include documents having image format or text-recognized format. The image format documents may be converted to text recognized format document using one or more text extraction techniques. Further, each of the documents 302 may include text data 310 in a unique format. In an embodiment, each of the document 302 may have text data and image data in various layouts or templates or formats. The OCR model 202 may determine the plurality of text features 304 of each of the documents 302. The plurality of text features 304 for each document may include a plurality of character embeddings of 'n' bits 306, and a plurality of position vectors of 'm' bits 308 of each character of the text data in a matrix format 312.

The exemplary text data 310 depicts a table comprising a predefined keyword such as "Purchase Order". The embeddings corresponding to each character of the keyword "Purchase Order" may include the character embedding vector of 'n' bits and the position embedding vector of 'm' bits [Position (X1, Y1, X2, Y2), Font size, Style, etc.] of each character of the keyword "Purchase Order".

Figure 4:
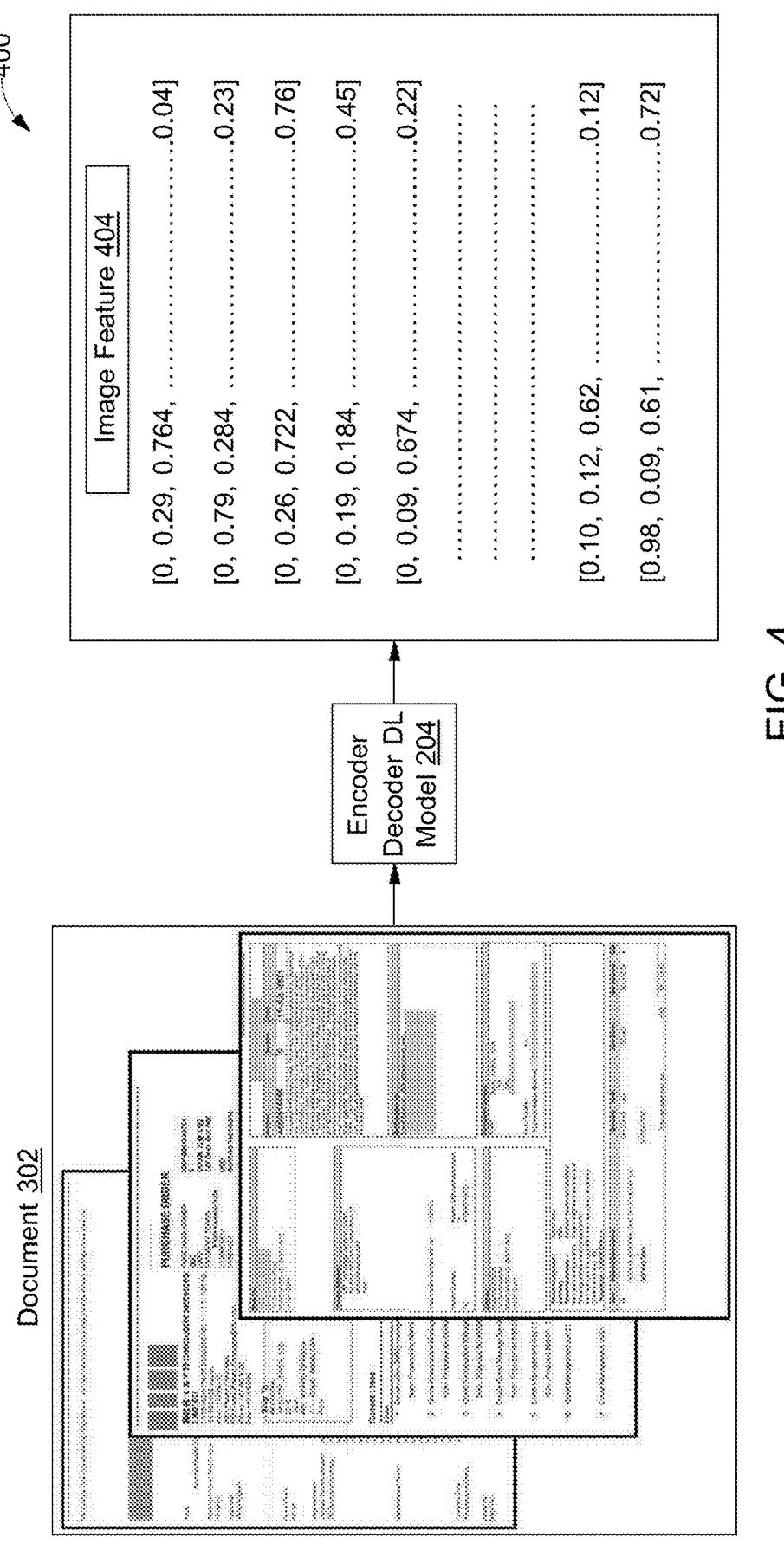
FIG. 4 illustrates an exemplary block diagram depicting the functioning of encoder decoder DL model, in accordance with an embodiment of the present disclosure.

Referring to FIG. 2, the encoder decoder DL model 204 may determine the plurality of image features of each of the plurality of documents. Referring now to FIG. 4, an exemplary block diagram depicting the functioning of the encoder decoder DL model 204 is illustrated, in accordance with an embodiment of the present disclosure. The block diagram 400 depicts inputting the plurality of documents 302 into the encoder decoder DL model 204. The encoder decoder DL model 204 in turn may determine the image features 404 of each of the plurality of documents 302. The image features 404 for each document may include vectors of plurality of image characters, position of each of the image characters, etc. in a matrix format.

Referring now to FIG. 2, the grouping device 102 may further determine a layout feature set of each of the plurality of documents based on the plurality of text features and the plurality of image features. The layout feature set of each of the plurality documents may be determined by concatenating the plurality of text features and the plurality of image features. The layout feature sets of each of the plurality of documents are inputted to the unsupervised ML model 206 that may group one or more documents which similar layouts determined based on their corresponding layout feature sets.

Figure 5:
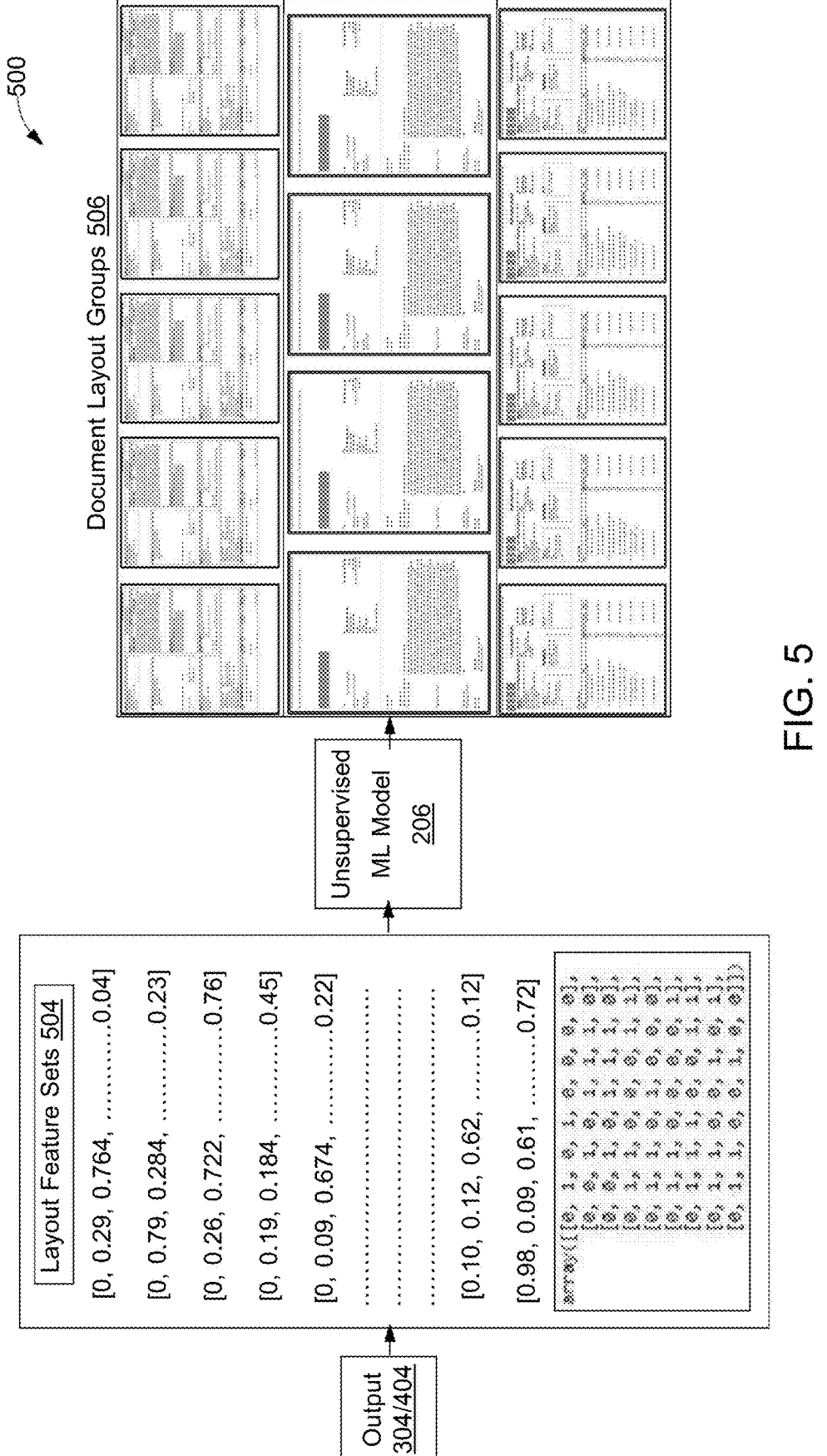
FIG. 5 illustrates an exemplary block diagram depicting the functioning of unsupervised ML model, in accordance with an embodiment of the present disclosure.

Referring now to FIG. 5, an exemplary block diagram depicting the functioning of unsupervised ML model 206 is illustrated, in accordance with an embodiment of the present disclosure. The unsupervised ML model diagram 500 may be inputted a plurality of layout feature sets 504 of each of the plurality of documents. Accordingly, the unsupervised ML model 206 may determine a group from a plurality of document layout groups 506 for each of the documents. The unsupervised ML model 206 may take layout feature sets 504 of the plurality of documents as input determine a unique group for documents having similar document layouts from the plurality documents.

In an embodiment, the unsupervised ML model 206 may group the each of the plurality of documents in one group from a set of groups based on determination of document layout of each of the plurality of documents. In an embodiment, the unsupervised ML model 206 may be selected as, but not limited to, K-means, agglomerative hierarchy, DBSCAN, BIRCH, Gaussian Mixture Model, etc. The document layout of each of the plurality of documents may be determined based on the corresponding layout feature set using the unsupervised ML model 206. Each group from the set of groups corresponds to a unique document layout.

Referring back to FIG. 2, the AI based similarity determination model 208 may determine the similarity of document layout between at least two documents from the plurality of documents based on a comparison of the corresponding layout features sets of the corresponding at least two documents. If in case layout of the new document is not similar to any of the documents already grouped in the set of groups, a new group may be created for grouping the new document based on its unique document layout.

Referring now to FIG. 6, a flowchart of a method for grouping documents based on layout determination is illustrated, in accordance with some embodiments of the present disclosure. In an embodiment, method 600 may include a plurality of steps that may be performed by the processor 104 to group documents based on document layout determination.

At step 602, the processor 104 may determine a plurality of text features of each of the plurality of documents. In an embodiment, the text features may be determined based on determination of character embedding and position vector of each character of text data in each of the plurality of documents. In an embodiment, the text data may be extracted using a text extraction tool. Further at step 604, the processor 104 may determine a plurality of image features of each of the plurality of documents. In an embodiment, the image features may be determined using an encoder-decoder deep learning (DL) model.

Further at step 606, the processor 104 may determine a layout feature set of each of the plurality of documents based on the plurality of text features and the plurality of image features. In an embodiment, the layout feature set may be determined by concatenating the plurality of text features and the plurality of image features for each of the plurality of documents.

Further at step 608, the processor 104 may group each of the plurality of documents in one group from a set of groups based on determination of a document layout of each of the plurality of documents. In an embodiment, the document layout of each of the plurality of documents may be determined based on the corresponding layout feature set using an unsupervised machine learning model. In an embodiment, each group from the set of groups may correspond to a unique document layout. In an embodiment the grouping of each of plurality of documents may include determining a similarity of document layout between at least two documents from the plurality of documents based on a comparison of the corresponding layout feature sets of the corresponding at least two documents. In an embodiment the similarity of document layout may be determined using an Artificial Intelligence based similarity determination model.

It is intended that the disclosure and examples be considered as exemplary only, with a true scope of disclosed

What is claimed is:

1. A method of grouping a plurality of documents, the method comprising:
   determining, by a processor, a plurality of text features of each of the plurality of documents;
   determining, by the processor, a plurality of image features of each of the plurality of documents;
   determining, by the processor, a layout feature set each of the plurality of documents based on the plurality of text features and the plurality of image features; and
   grouping, by the processor, each of the plurality of documents in one group from a set of groups based on determination of a document layout of each of the plurality of documents,
      wherein the document layout of each of the plurality of documents is determined based on the corresponding layout feature set using an unsupervised machine learning model, and
      wherein each group from the set of groups corresponds to a unique document layout.

2. The method of claim 1, wherein the text features are determined based on determination of character embedding and position vector of each character of text data in each of the plurality of documents, wherein the text data is extracted using a text extraction tool.

3. The method of claim 1, wherein the image features are determined using an encoder-decoder deep learning (DL) model.

4. The method of claim 1, wherein the grouping of each of the plurality of documents comprises:

determining, by the processor, a similarity of document layout between at least two documents from the plurality of documents based on a comparison of the corresponding layout feature sets of the corresponding at least two documents, wherein the similarity of document layout is determined using an Artificial Intelligence based similarity determination model.

5. A system of grouping a plurality of documents, the system comprising:

a processor; and a memory communicably coupled to the processor, wherein the memory stores processor-executable instructions, which, on execution by the processor, cause the processor to:

determine a plurality of image features of each of the plurality of documents;

determine a layout feature set each of the plurality of documents based on the plurality of text features and the plurality of image features; and group each of the plurality of documents in one group from a set of groups based on determination of a document layout of each of the plurality of documents, wherein the document layout of each of the plurality of documents is determined based on the corresponding layout feature set using an unsupervised machine learning model, and wherein each group from the set of groups corresponds to a unique document layout.

6. The system of claim 5, wherein the text features are determined based on determination of character embedding and position vector of each character of text data in each of the plurality of documents, wherein the text data is extracted using a text extraction tool.

7. The system of claim 5, wherein the image features are determined using an encoder-decoder deep learning (DL) model.

8. The system of claim 5, wherein the grouping of each of the plurality of documents is based on determination of a similarity of document layout between at least two documents from the plurality of documents based on a comparison of the corresponding layout feature sets of the corresponding at least two documents, wherein the similarity of document layout is determined using an Artificial Intelligence based similarity determination model.

9. A non-transitory computer-readable medium storing computer-executable instructions for grouping a plurality of documents, the computer-executable instructions configured for:

determining a plurality of text features of each of the plurality of documents;

determining a plurality of image features of each of the plurality of documents;

determining a layout feature set each of the plurality of documents based on the plurality of text features and the plurality of image features; and grouping each of the plurality of documents in one group from a set of groups based on determination of a document layout of each of the plurality of documents, wherein the document layout of each of the plurality of documents is determined based on the corresponding layout feature set using an unsupervised machine learning model, and wherein each group from the set of groups corresponds to a unique document layout.

10. The non-transitory computer-readable medium of claim 9, wherein the text features are determined based on determination of character embedding and position vector of each character of text data in each of the plurality of documents, wherein the text data is extracted using a text extraction tool.

11. The non-transitory computer-readable medium of claim 9, wherein the image features are determined using an encoder-decoder deep learning (DL) model.

12. The non-transitory computer-readable medium of claim 9, wherein the computer-executable instructions are configured to group each of the plurality of documents by:

determining a similarity of document layout between at least two documents from the plurality of documents based on a comparison of the corresponding layout feature sets of the corresponding at least two documents, wherein the similarity of document layout is determined using an Artificial Intelligence based similarity determination model.

* * * * *